(12) United States Patent
Mihajlovic et al.

(10) Patent No.: US 9,989,056 B2
(45) Date of Patent: Jun. 5, 2018

(54) HYDRAULIC PUMP WITH INTEGRATED CLUTCH

(71) Applicants: Mike Mihajlovic, Rockford, IL (US); William C. Pizzo, Elgin, IL (US); Jeffrey Maney, Rockford, IL (US)

(72) Inventors: Mike Mihajlovic, Rockford, IL (US); William C. Pizzo, Elgin, IL (US); Jeffrey Maney, Rockford, IL (US)

(73) Assignee: Concentric Rockford Inc., Rockford, IL (US)

( * ) Notice: Subject to any disclaimer, the term of this patent is extended or adjusted under 35 U.S.C. 154(b) by 436 days.

(21) Appl. No.: 14/861,753

(22) Filed: Sep. 22, 2015

(65) Prior Publication Data

US 2016/0084321 A1 Mar. 24, 2016

Related U.S. Application Data

(60) Provisional application No. 62/053,522, filed on Sep. 22, 2014.

(51) Int. Cl.
| | |
|---|---|
| *F04C 15/00* | (2006.01) |
| *F16D 48/02* | (2006.01) |
| *F16D 25/0632* | (2006.01) |

(52) U.S. Cl.
CPC ...... *F04C 15/0061* (2013.01); *F16D 25/0632* (2013.01); *F16D 48/02* (2013.01); *F16D 2048/0212* (2013.01); *F16D 2048/0233* (2013.01); *F16D 2300/24* (2013.01)

(58) Field of Classification Search
None
See application file for complete search history.

(56) References Cited

U.S. PATENT DOCUMENTS

| | | | |
|---|---|---|---|
| 6,261,202 B1 | 7/2001 | Forrest et al. | |
| 6,484,858 B1 | 11/2002 | Mimura | |
| 6,676,555 B2 | 1/2004 | Duan | |
| 7,231,845 B2 | 6/2007 | Klaricic | |
| 7,815,001 B2 † | 10/2010 | Liljeblad | |
| 8,925,703 B2 | 1/2015 | Wolf et al. | |
| 2007/0023253 A1* | 2/2007 | Wayman | F16D 25/0632 192/66.22 |
| 2007/0131514 A1* | 6/2007 | Settineri | F16D 25/0632 192/85.54 |
| 2012/0148385 A1* | 6/2012 | Widemann | B60K 17/02 415/123 |

* cited by examiner
† cited by third party

*Primary Examiner* — Jacob S. Scott
(74) *Attorney, Agent, or Firm* — Forge IP, PLLC

(57) ABSTRACT

A hydraulic pump with an integrated clutch includes an outer cone coupled to a drive gear or a driven gear and having a frictional inner surface, and an inner cone arranged inside the outer cone, coupled to the drive gear or the driven gear and having a frictional outer surface, wherein the inner and outer cones are rotationally and axially movable with respect to each other. A spring is coupled to the inner cone or the outer cone and acts to axially displace the inner cone with respect to the outer cone in a first direction. An actuator including a rod and a piston is coupled to the inner cone or the outer cone and acts to overcome the force of the spring to axially displace the inner cone with respect to the outer cone in a second direction being axially opposite to the first direction.

22 Claims, 7 Drawing Sheets

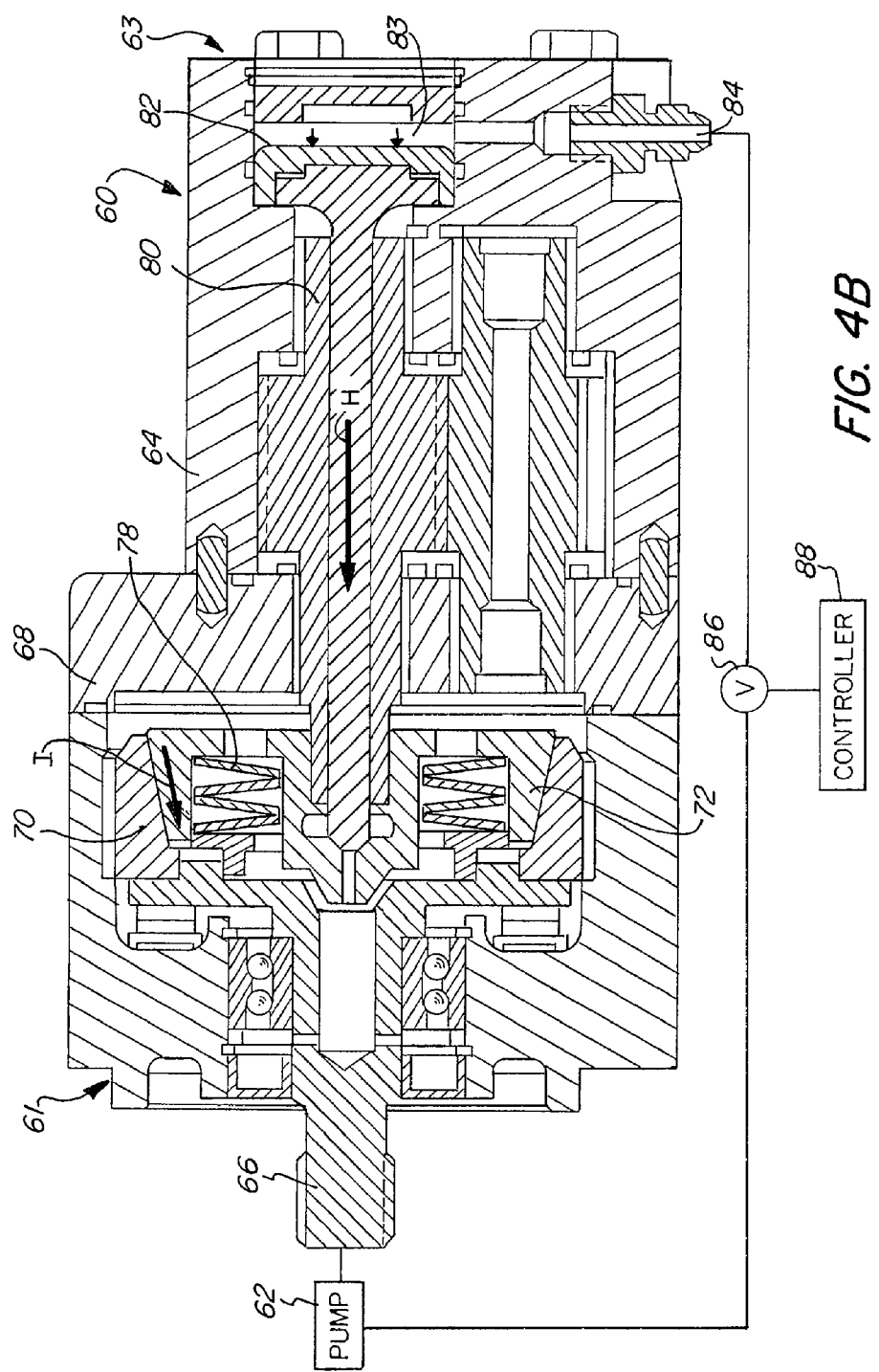

HYDRAULIC PUMP WITH INTEGRATED CLUTCH

FIELD OF THE INVENTION

The present invention relates to hydraulic power transmission systems. In particular, the present invention relates to a hydraulic pump with an integrated clutch for unloading the pump.

BACKGROUND OF THE INVENTION

It is well-known to transfer energy from a source such as a motor or internal combustion engine to a load through the intermediary of hydraulic drive system. Such systems will typically have a pump driven by the source and a motor connected to the load. By adjusting the hydraulic flow between the pump and the motor it is possible to impart movement to the load, maintain it in a fixed position and otherwise influence its disposition.

The control of fluid flow is typically accomplished by a valve mechanism, which in its simplest form simply opens or closes the flow between the pump and motor and thereby regulates movement of the load. Such valve systems are relatively inefficient in terms of the energy dissipated across the valve. In a typical installation, the valve would be closed centered requiring the pump to deliver pressure against a relief valve. The energy provided to the fluid is thus dissipated as heat. In an open center arrangement, careful manufacture of the valve is required in order to obtain the transition between the zero flow and full flow whilst retaining control of the load and metering of the flow across the valve, which causes loss of energy.

The valves used to control flow therefore are relatively complicated and made to a high degree of precision in order to attain the necessary control function. As such, the valves tend to be specialized and do not offer flexibility in implementing different control strategies. Most significantly, since the control is achieved by metering flow across an orifice there is inherently significant energy loss when controlling fluid flow. The control valve regulates movement by controlling flow across a restricted port at the inlet to the device. Because the control valve is typically a one piece spool, a similar restricted port is presented to the exhaust flow and results in a significant energy loss.

What is desired therefore, is an improved system for unloading a hydraulic pump that can eliminate energy consumption of the hydraulic pump when work is not being performed and extend the hydraulic pump life. What is also desired is an unloading system that provides a power density and packaging envelope advantage by saving space through the integration of components. What is further desired is an unloading system that experiences substantially less parasitic loss and reduces environmental noise emission over traditional hydraulic bypass systems, thus allowing for ease of use, and increased versatility.

SUMMARY OF THE INVENTION

Therefore, it is an object of the invention to create a better, more energy efficient solution of unloading the pump and integrating components.

In order to overcome the deficiencies of the prior art and to achieve at least some of the objects and advantages listed, the invention comprises a hydraulic pump with an integrated clutch, including a pump housing, a drive shaft and a driven shaft disposed in the pump housing, a clutch housing coupled to the pump housing, an outer cone disposed in the clutch housing, the outer cone coupled to at least one of the drive shaft and the driven shaft and having an inner surface, an inner cone arranged inside the outer cone, the inner cone coupled to at least one of the drive gear and the driven gear and having an outer surface, wherein the inner cone and the outer cone are rotationally and axially movable with respect to each other and wherein at least one of the inner surface of the outer cone and the outer surface of the inner cone has a frictional material, a spring coupled to at least one of the inner cone and the outer cone, wherein the spring acts to axially displace the outer surface of the inner cone with respect to the inner surface of the outer cone in a first direction, and an actuator coupled to at least one of the inner cone and the outer cone, the actuator comprising a rod and a piston, wherein the piston is actuated by a hydraulic force supplied by the pump, and wherein the actuator acts to overcome the force of the spring and to axially displace the outer surface of the inner cone with respect to the inner surface of the outer cone in a second direction, the second direction being axially opposite to the first direction.

In some embodiments, the clutch housing is removably coupled to the pump housing.

In certain embodiments, the clutch housing is coupled to the pump housing via an SAE mounting flange.

In some cases, the outer cone is coupled to the drive shaft and the inner cone is coupled to the driven shaft.

In certain embodiments, the spring is coupled to the inner cone and the actuator is coupled to the inner cone. In some of these embodiments, the spring acts on the inner cone to bring the outer surface of the inner cone into frictional contact with the inner surface of the outer cone, and the actuator acts on the inner cone to overcome the force of the spring and disengage the frictional contact between the outer surface of the inner cone and the inner surface of the outer cone to disengage the clutch. In additional embodiments, the spring acts on the inner cone to maintain a disengaged configuration of the clutch wherein there is no frictional contact between the outer surface of the inner cone and the inner surface of the outer cone, and the actuator acts on the inner cone to overcome the force of the spring and to bring the outer surface of the inner cone into frictional contact with the inner surface of the outer cone to engage the clutch.

In some embodiments, the inner cone is axially displaced by actuating the rod in a direction toward the inner cone. In certain of these embodiments, the piston has a distal end and a proximal end, the rod being coupled to the proximal end, and the rod is actuated by applying the hydraulic force to the proximal end of the piston. In other embodiments, the inner cone is axially displaced by actuating the rod in a direction away from the inner cone. In certain of these embodiments, the piston has a distal end and a proximal end, the rod being coupled to the proximal end, and the rod is actuated by applying a hydraulic force to the distal end of the piston.

In certain embodiments, an angle between the frictional surfaces of the inner and outer cones and respective cone axes is directly proportional to an amount of hydraulic force required to axially displace the frictional surfaces with respect to each other.

A clutch for a hydraulic pump is also provided, including an outer cone with a frictional inner surface, an inner cone with a frictional outer surface, the inner cone arranged inside the outer cone and rotationally and axially movable with respect to the outer cone, a pre-stressed spring coupled to the inner cone, wherein the spring axially moves the inner cone in a first direction to bring the outer surface of the inner cone into frictional contact with the inner surface of the outer cone, and an actuator coupled to the inner cone, the actuator comprising a rod engaging the inner cone and a hydraulically actuated piston engaging the rod, wherein the actuator axially moves the inner cone in a second direction being axially opposite to the first direction to overcome the force of the spring and disengage the frictional contact between the outer surface of the inner cone and the inner surface of the outer cone.

In certain embodiments, the inner cone is axially displaced by actuating the rod in a direction toward the inner cone. In some of these embodiments, the piston has a distal end and a proximal end, the rod being coupled to the proximal end, and the rod is actuated by applying a hydraulic force to the proximal end of the piston. In additional embodiments, the inner cone is axially displaced by actuating the rod in a direction away from the inner cone. In some of these embodiments, the piston has a distal end and a proximal end, the rod being coupled to the proximal end, and the rod is actuated by applying a hydraulic force to the distal end of the piston.

A clutch for a hydraulic pump is further provided having an outer cone with a frictional inner surface, an inner cone with a frictional outer surface, the inner cone arranged inside the outer cone and axially and rotationally movable with respect to the outer cone, a spring coupled to the inner cone, wherein the spring acts on the inner cone to maintain a disengaged configuration of the clutch wherein there is no frictional contact between the outer surface of the inner cone and the inner surface of the outer cone, and an actuator coupled to the inner cone, the actuator comprising a rod engaging the inner cone and a hydraulically actuated piston engaging the rod, wherein the actuator acts on the inner cone to axially displace the inner cone with respect to the outer cone to overcome the force of the spring and to bring the outer surface of the inner cone into frictional contact with the inner surface of the outer cone.

In some embodiments, the inner cone is axially displaced by actuating the rod in a direction toward the inner cone. In certain of these embodiments, the piston has a distal end and a proximal end, the rod being coupled to the proximal end, and the rod is actuated by applying a hydraulic force to the proximal end of the piston. In other embodiments, the inner cone is axially displaced by actuating the rod in a direction away from the inner cone. In some of these embodiments, the piston has a distal end and a proximal end, the rod being coupled to the proximal end, and the rod is actuated by applying a hydraulic force to the distal end of the piston.

Other objects of the invention and its particular features and advantages will become more apparent from consideration of the following drawings and accompanying detailed description.

BRIEF DESCRIPTION OF THE DRAWINGS

FIG. 4B is a cross-sectional view and partially schematic view of the hydraulic pump with the integrated clutch of FIG. 4A, in which the clutch is hydraulically actuated.

DETAILED DESCRIPTION OF THE INVENTION

The system of the present invention presents a number of advantages over the systems known in the art. It is designed to provide an "On/Off" solution, or power on demand product, that can eliminate energy consumption of the hydraulic pump when work is not being performed. It also extends the hydraulic pump life by allowing the system to be used intermittently as opposed to continually, whereby less strain is placed on the hydraulic pump system over a given period of time.

The system of the present invention also provides a power density and packaging envelope advantage by saving space through the integration of components. Compared to the prior art, such as current hydraulic bypass solutions, the present invention experiences substantially less parasitic loss. By integrating the clutch and actuator, the present system is a highly power dense solution to hydraulic bypass.

Additionally, the system of the present invention reduces environmental noise emission over traditional hydraulic bypass systems, thus allowing for ease of use, and increased versatility.

The system can also be designed with fail-safe integrated options for actuation. As discussed in more detail below, in one embodiment, a spring applied/hydraulic off mechanism is used where the mechanism is designed to close when pressure reaches a critical level. In another embodiment, hydraulic applied/spring off mechanism is used where the mechanism is designed to close upon loss of control pressure.

Figure 1A:
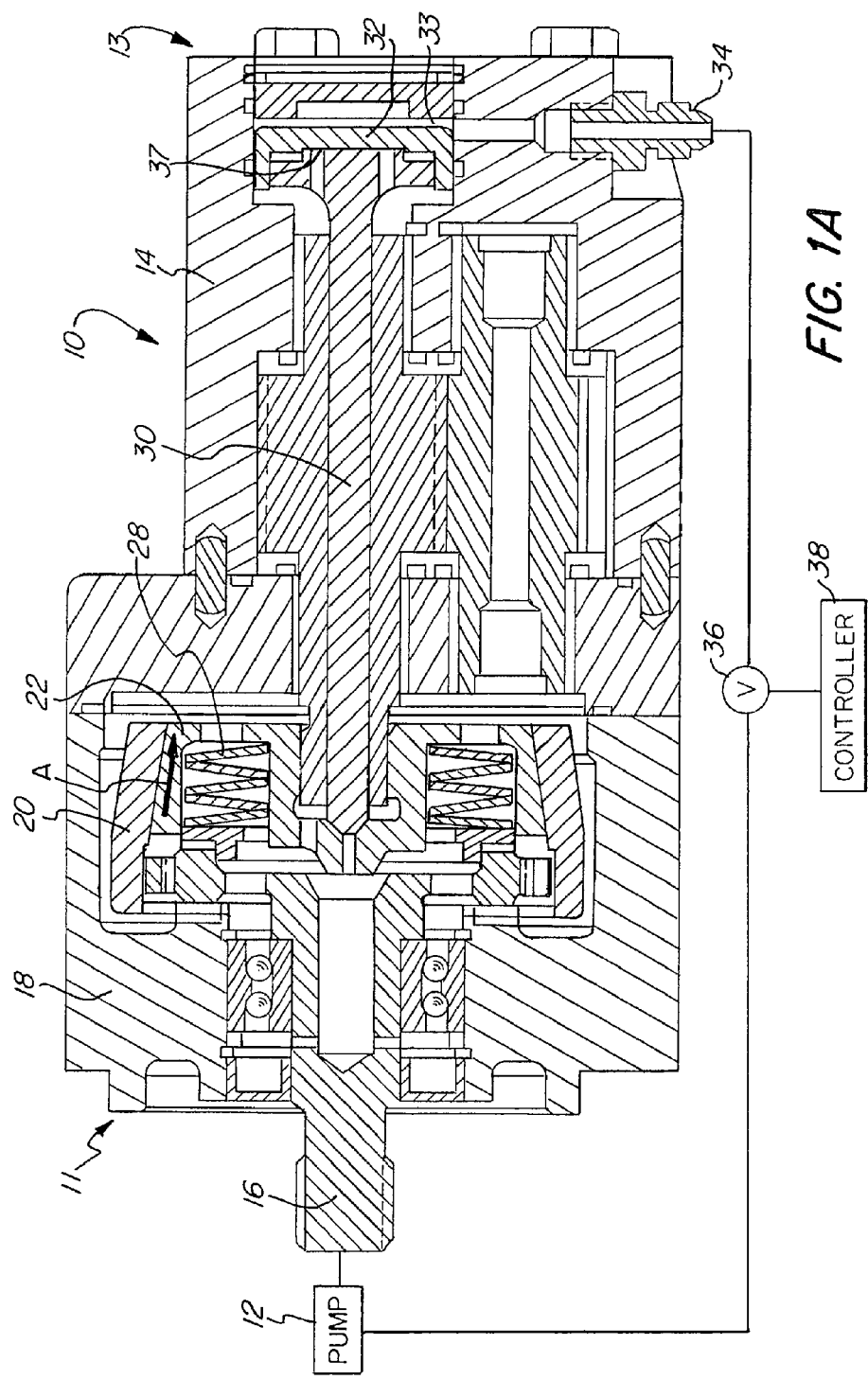
FIG. 1A is a cross-sectional and partially schematic view of the hydraulic pump with an integrated clutch according to the invention with a push rod actuator, in which the clutch is spring actuated.
Figure 1B:
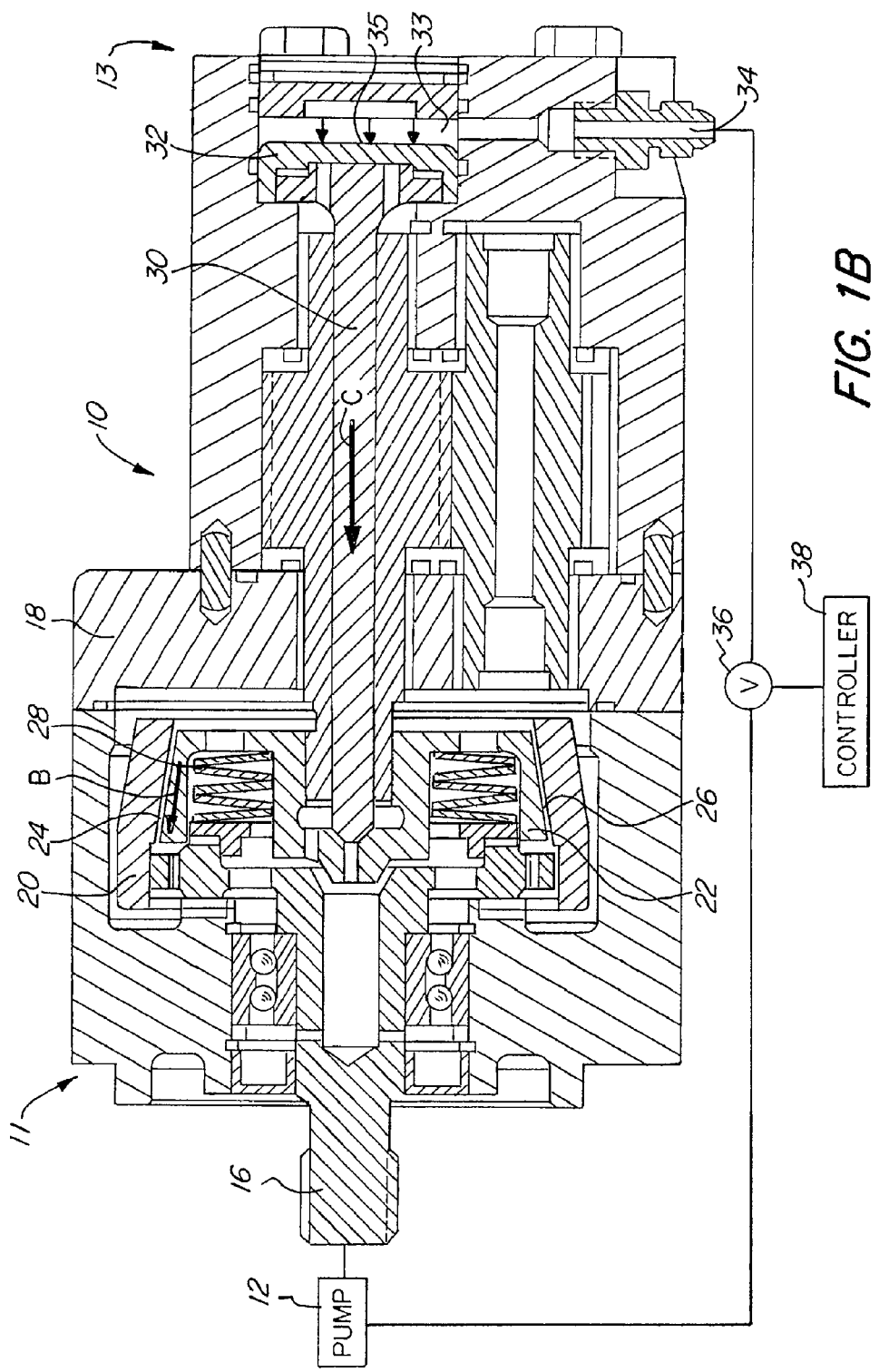
FIG. 1B is a cross-sectional view and partially schematic view of the hydraulic pump with the integrated clutch of FIG. 1A, in which the clutch is hydraulically released.

The present invention involves an integrated hydraulic pump and clutch assembly, one exemplary embodiment of which is illustrated in FIGS. 1A and 1B. The system (10) includes a pump housing (12) accommodating the pump components and a clutch housing (14) that houses the clutch components. The system (10) may be used with any type of gear hydraulic pump. In one embodiment, a fixed displacement gear pump is used. Either a pressure compensated or a non-compensated gear pump may be used.

Figure 2:
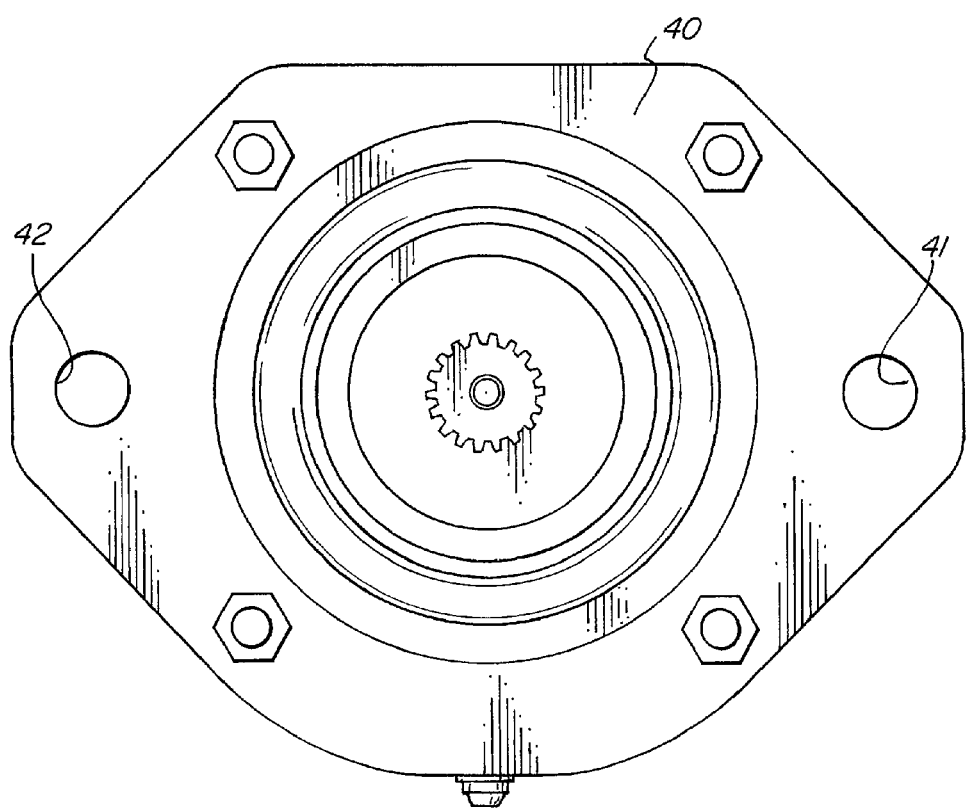
FIG. 2 is a side view of the clutch assembly of FIGS. 1A-1B, illustrating a flange for connection to the hydraulic pump.

The pump housing (12) is removably or fixedly coupled to the clutch housing (14). In one exemplary embodiment illustrated in FIG. 2, a standard SAE type mounting flange (40) is used to couple the clutch housing (14) to the pump housing (12). The flange (40) includes two holes (41, 42) that accommodate bolts for attachment to the pump (12). This gives the system a wide range of uses and applications. It is understood, however, that any other suitable type of connection may be used to couple the pump to the clutch assembly. It is also noted that the clutch assembly may be integrated into the pump housing.

Referring back to FIG. 1A, the system including an outer cone (20) and an inner cone (22) disposed in the clutch housing (14). An inner surface (24) of the outer cone (20) and an outer surface (26) of the inner cone (22). The cone are made with any suitable material, such as, e.g., steel or brass. The inner cone (22) is arranged inside the outer cone (20) such that the inner surface (24) of the outer cone and the outer surface (26) of the inner cone are positioned adjacent to each other such that they can come into contact with each other, as shown in FIG. 1A. The inner cone (22) and the outer cone (20) are rotationally and axially movable with respect to each other and have axes that are preferably in alignment. Both cones can rotate in either direction of the cone axis depending upon desired application.

At least one of the inner surface (24) and the outer surface (26) has a frictional material that engages the other surface such that they mate. Any suitable frictional material, such as carbon pads, may be used. In some embodiments, both the inner surface (24) and the outer surface (26) have frictional material. When the corresponding surfaces of the inner cone (22) and the outer cone (20) are brought into frictional contact, the cones rotate together and transmit torque by friction. Such arrangement is advantageous over the other types of clutch coupling because of the wedging action and the increased contact surface area between the cones. A slope angle of each cone relative to the cone axis is directly proportional to the axial force required to bring the frictional surfaces of the cones into contact at a predetermined surface pressure. In other words, the smaller the slope angle of the cones relative their axis, the less force is required to achieve the desired surface pressure at the frictional surfaces of the cones, and thus, a higher torque is achieved with relatively small contact force.

In the embodiment shown in FIGS. 1A and 1B, the outer cone (20) is coupled to a drive shaft (18), which is in turn coupled to a source of rotational power, and the inner shaft is coupled to a driven shaft (16) of the pump. However, it is understood that in other embodiments of the invention, the inner cone may be coupled to the drive shaft and the outer cone may be coupled to the driven shaft.

Additionally, in the embodiment of FIGS. 1A and 1B, the outer cone (20) is axially fixed in the housing (14) and only the inner cone is axially movable, which allows the inner surface (24) to come into frictional contact with the outer surface (26) by the force of the spring (28). It is noted, however, that in additional invention embodiments, the inner cone (22) may be fixed axially and the outer cone (20) may be axially movable relative the inner cone to achieve the friction contact between the respective cone surfaces.

The system (10) also includes a spring (28) coupled to the inner cone (22). One side of the spring (28) is fixedly attached to the housing (14) and the other side acts on the inner cone (22) to axially displace the inner cone (22) relative the outer cone (20). In the embodiment illustrated in FIG. 1A, the spring (28) exerts force on the inner cone (22) to axially displace the inner cone toward a distal end (13) of the housing (14), as shown by an arrow A. This axial displacement brings the outer surface (26) of the inner cone (22) into frictional contact with the inner surface (24) of the outer cone (20) to engage the clutch such that a torque can be transmitted from the drive shaft (18) to the driven shaft (16). It is understood that, in other embodiments, the spring (28) may be coupled to the outer cone (20) instead of the inner cone (22) to axially displace the outer cone relative the inner cone.

The clutch assembly further includes an actuator coupled to at least one of the inner cone (22) and the outer cone (20). In the embodiment shown in FIGS. 1A and 1B, the actuator is coupled to the inner cone (22) and acts to axially move the inner cone in the direction indicated by an arrow B toward a proximal end (11) of the clutch housing (14), the direction B being axially opposite to the direction A. The force of the actuator overcomes the force of the spring (28) and disengages the frictional contact between the outer surface (26) of the inner cone (22) and the inner surface (24) of the outer cone (20), as shown in FIG. 1B. This disengages the clutch such that no torque is transmitted from the drive shaft (18) to the driven shaft (16).

The actuator comprises a piston (32) having a proximal end (37) and a distal end (35), and a rod (30) coupled to the proximal end of the piston and engaging the inner cone (22). The piston is slidably disposed in an actuation chamber (33), which is fluidly connected to an inlet port (34) that receives a hydraulic fluid from the pump (12). As the hydraulic fluid is supplied to the chamber (33) through the inlet port (34), it exerts force on the distal end (35) of the piston (32), which in turn exerts force on the rod (30) to actuate the rod in the direction indicated by an arrow C toward the proximal end (11) of the housing (14). When actuated, the pushrod (30) extends through a hollow portion of the driven gear (16) and engages with the inner cone (22) with enough force to overcome the force exerted by the spring (28) on the inner cone, disengaging the inner cone (22) from the outer cone (20) and effectively removing the rotational power from the pump (12). When the force exerted on the piston and rod is removed, the spring (28) returns into its natural uncompressed configuration, thus moving the inner cone (22) in the direction A and bringing the respective cone surfaces into friction connection, thereby engaging the clutch.

The piston and rod actuator of the clutch assembly of the present invention increases the amount of hydraulic force exerted on the cones such that a higher force is exerted at lower hydraulic fluid pressures. The hydraulic force exerted by the rod is directly proportional to the diameter of the piston. By increasing the diameter of the piston, it is possible to transmit a higher actuation force to the cones at the same hydraulic pressure supplied by the pump. Thus, the system of the present invention is advantageous in that it can be adjusted to provide a higher hydraulic force to frictionally engage the cone surfaces when desired by varying the diameter of the actuator piston.

A further advantage of the present system is that it provides a highly power dense and space saving solution to prior art hydraulic bypass systems by integrating the clutch and actuator with the hydraulic system of the pump. It also provides a safer design by placing the source of hydraulic fluid at a location remote from the cone components of the clutch assembly.

The system (10) includes a control valve (36) positioned in the fluid line between the pump (12) and the inlet port (34). The valve (36) functions to control the supply of hydraulic fluid from the pump to the actuator of the clutch assembly to engage and disengage the clutch. The valve is operated by a controller (38) coupled to the valve. The controller controls the opening and closing of the valve (36) based on various parameters, such as the need for the torque transmission by the pump and the amount of torque needed to be transmitted.

In certain applications, it may be desirable to lower the amount of torque transmitted between the drive and driver shafts of the pump instead of completely terminating the torque transmission. This can be achieved by varying the amount of hydraulic force supplied to the clutch actuator by the pump, such that there is less frictional surface contact between the inner and outer cones. The controller (38) regulates closing and opening of the valve (36) to regulate the amount of hydraulic force exerted on the piston (32) and the rod (30) to control the frictional surface contact between the cones in order to achieve the desired torque transmission of the pump.

In some embodiments, the system (10) includes one or more lubrication sources in the housing (14). The lubrication sources supply lubrication fluid, such as oil, to cool the friction surfaces of the inner cone (22) and/or outer cone (20). The lubrication sources may be life-time lubrication sources positioned inside the closed clutch housing (14). Alternatively, the lubrication fluid may be supplied from external lubrication sources via bearings of the drive and/or driven shafts.

Figure 3A:
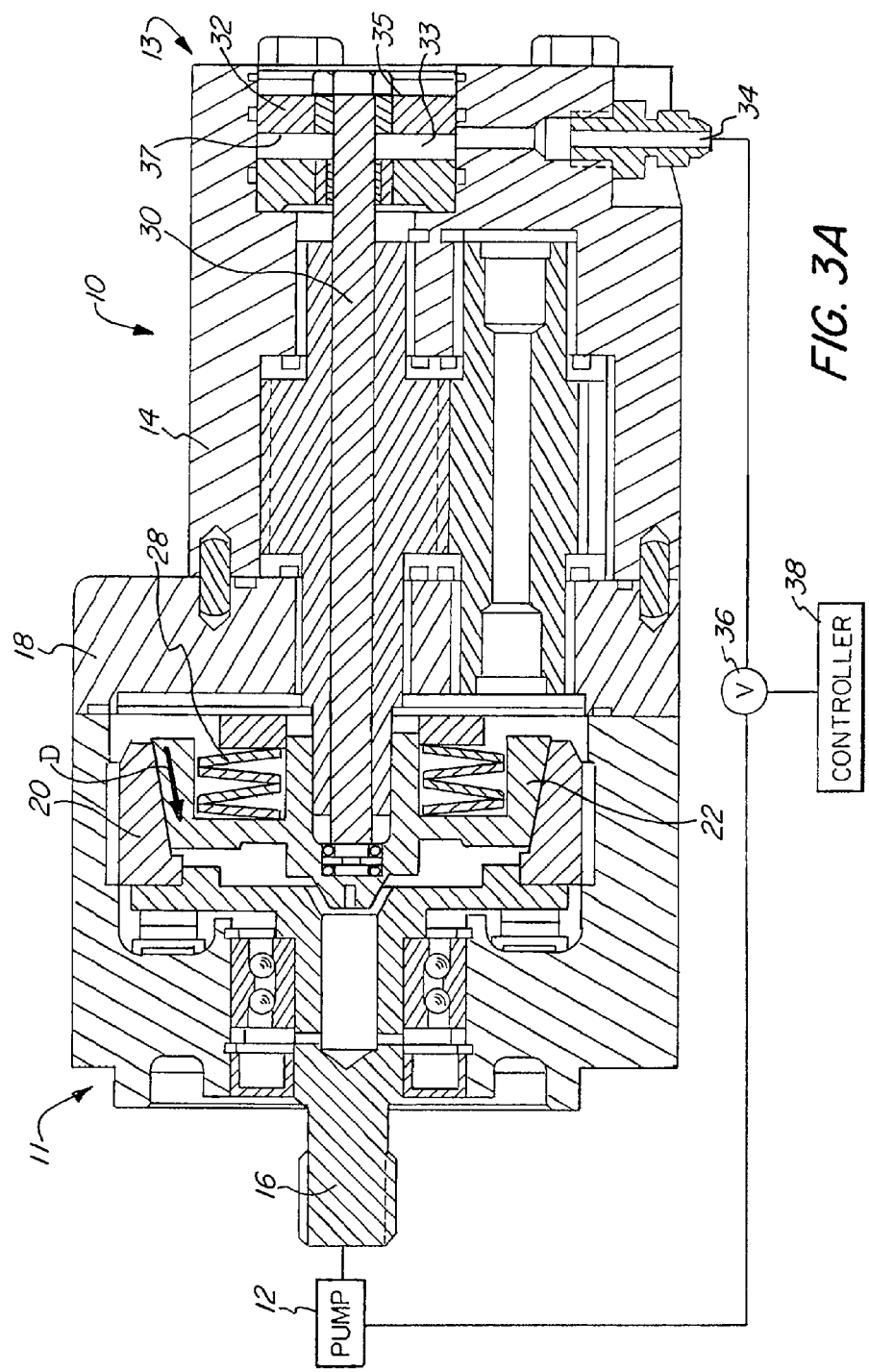
FIG. 3A is a cross-sectional and partially schematic view of the hydraulic pump with an integrated clutch according to the invention with a pull rod actuator, in which the clutch is spring actuated.
Figure 3B:
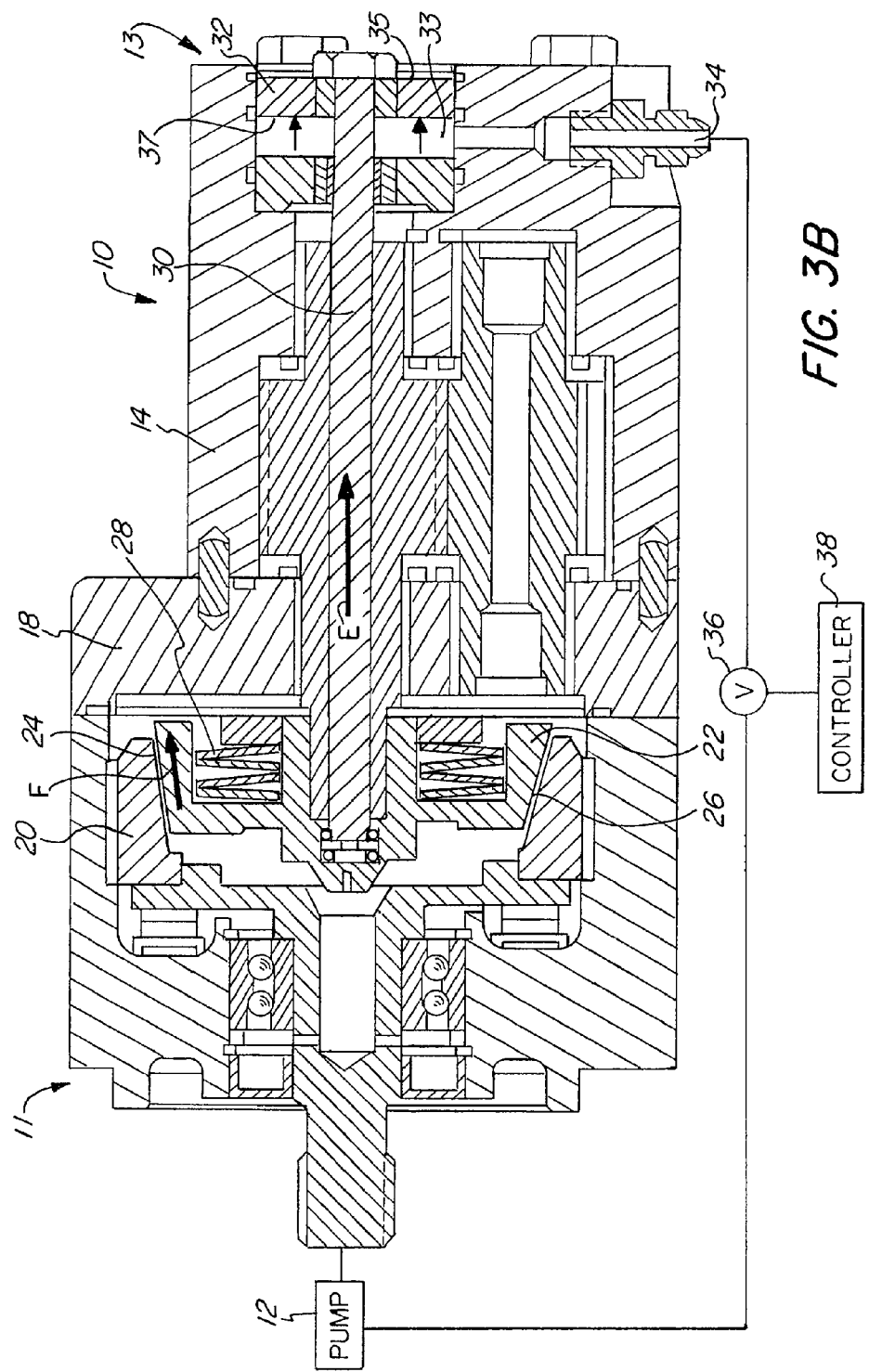
FIG. 3B is a cross-sectional view and partially schematic view of the hydraulic pump with the integrated clutch of FIG. 3A, in which the clutch is hydraulically released.

FIGS. 3A and 3B illustrate another exemplary actuation mechanism for the clutch assembly of the present invention. In this embodiment, the inner cone (22) and the spring (28) are arranged such that the spring acts on the inner cone to move in the direction D toward the proximal end (11) of the clutch housing (14). The outer cone (20) is also arranged such that this motion of the inner cone (22) brings the outer surface (26) of the inner cone into the friction contact with the inner surface (24) of the outer cone, thereby initiating transmission of rotational torque from the drive shaft to the driven shaft.

When it is desired to disengage the clutch, hydraulic fluid is supplied to the actuation chamber (33) via the inlet port (34). The fluid pressure in the chamber exerts force on the proximal end (37) of the piston (32) disposed in the chamber, which causes the rod (30) coupled to the proximal end of the piston to move in the direction indicated by an arrow E in FIG. 3B. This motion of the rod (30) overcomes the force of the spring (28) and causes the inner cone (22) coupled to the rod to move in the direction F, thereby terminating or lessening the frictional contact between the cone surfaces.

The embodiments of the system illustrated in FIGS. 1A-1B and 3A-3B are particularly useful in applications where it is desirable for the mechanism to cease operation when pressure reaches a critical level. This way, the system provides an integrated fail-safe mechanism for actuation of the pump.

Figure 4A:
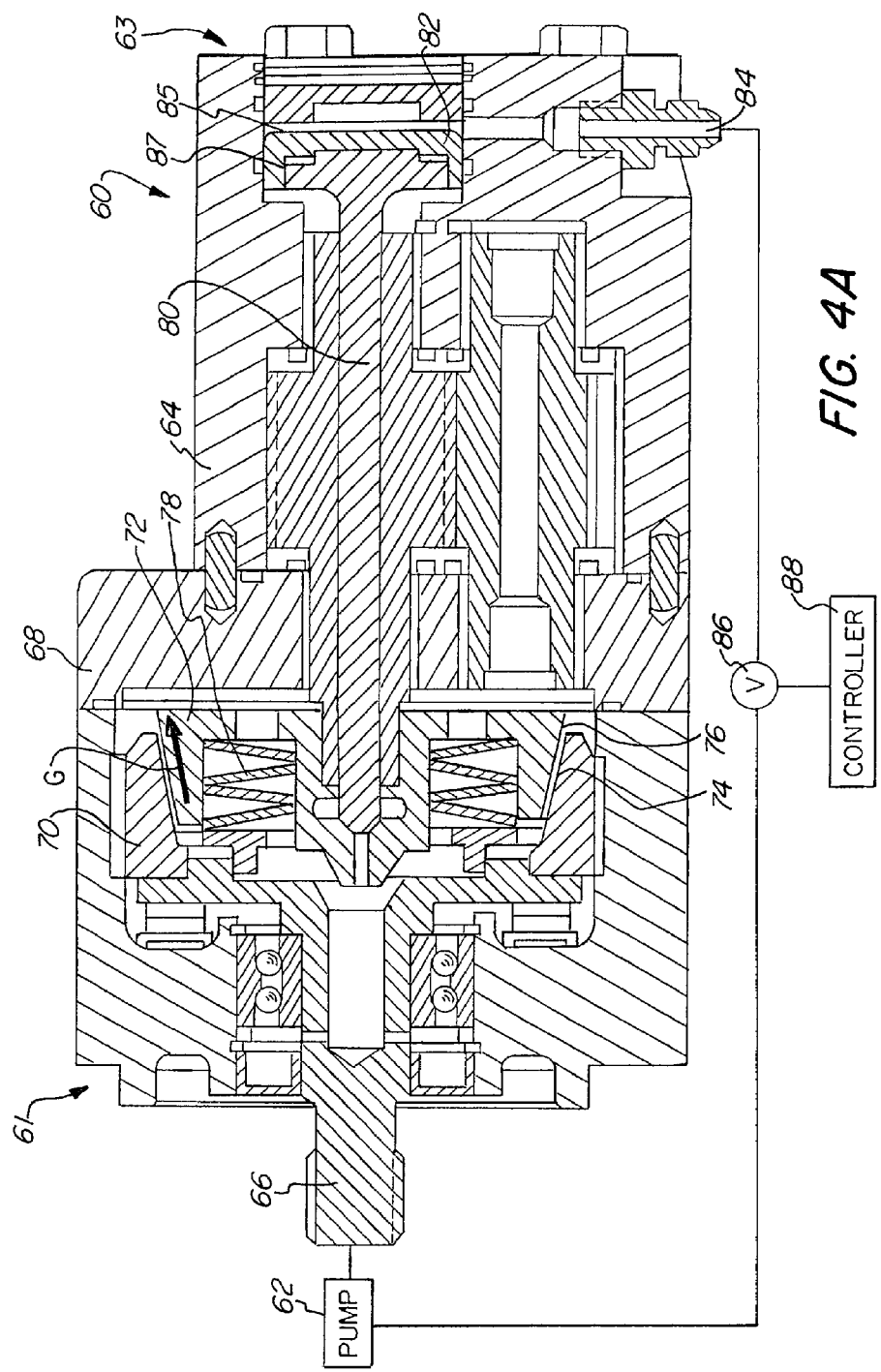
FIG. 4A is a cross-sectional and partially schematic view of the hydraulic pump with an integrated clutch according to the invention, in which the clutch is spring released.

In other applications, it may be desirable for the pump mechanism to stop operating upon loss of control pressure. In this embodiment of the invention illustrated in FIGS. 4A and 4B, the clutch is engaged by the hydraulic force applied to the actuator and is disengaged by the force of the spring. The structure of the system (60) is generally similar to the structure of the system described in connection with FIGS. 1A an 1B above. The system (60) includes a pump (62) and a clutch assembly (64) coupled to the pump. The system also includes a valve (86) that regulates the amount of hydraulic fluid supplied to the clutch actuator and a controller (88) for operating the valve. The clutch assembly includes an inner cone (72) coupled to the driven shaft (66) and the outer cone (70) coupled to the drive shaft (68). The inner cone has a frictional outer surface (76) and the outer cone has a frictional inner surface (74). It is noted that only one of the cones may be provided with a frictional surface.

The inner cone (72) is arranged inside and is axially movable relative to the outer cone (70) such that the respective frictional surfaces of the cones interact when brought into contact. A spring (78) is coupled to the inner cone (72). The spring displaces the inner cone (72) in a direction G toward the distal end (63) of the clutch housing (64). The cones are arranged such that the force of the springs lessens or terminates the frictional contact between the cone surfaces (74) and (76), thereby disengaging the clutch.

The clutch has a rod (80) coupled to the inner cone (72) and a piston, a proximal end (61) of which is coupled to the rod (80). In order to engage the clutch, hydraulic fluid is supplied by the pump (62) to an actuation chamber (83) through an inlet port (84). The hydraulic fluid pressure exerts force on a distal end (85) of the piston (82) slidably disposed in the chamber. This causes the piston (82) and the attached rod (80) to move in the axial direction toward the proximal end (61) of the clutch housing, indicated by the arrow H in FIG. 4B. The piston and the rod overcome the force of the spring (78) and cause the inner cone (72) to move in the axial direction I, thereby coupling the frictional surfaces of the inner and outer cones and providing power to the pump (62).

Although this embodiment of the present invention has only been described as utilizing a push rod actuator, it is understood that a pull rod actuator, such as illustrated in FIGS. 3A and 3B, may also be used to engage the clutch. Additionally, it is noted that the spring and/or the actuator mechanism may be coupled to the outer cone (70) instead of the inner cone (72) and the outer cone may move axially relative the inner cone to engage and disengage the frictional surfaces of the cones.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A hydraulic pump with an integrated clutch, comprising:
   a pump housing;
   a drive shaft and a driven shaft disposed in the pump housing;
   a clutch housing coupled to the pump housing;
   an outer cone disposed in the clutch housing, the outer cone coupled to at least one of the drive shaft and the driven shaft and having an inner surface;
   an inner cone arranged inside the outer cone, the inner cone coupled to at least one of the drive shaft and the driven shaft and having an outer surface, wherein the inner cone and the outer cone are rotationally and axially movable with respect to each other and wherein at least one of the inner surface of the outer cone and the outer surface of the inner cone has a frictional material;
   a spring coupled to at least one of the inner cone and the outer cone, wherein said spring acts to axially displace the outer surface of the inner cone with respect to the inner surface of the outer cone in a first direction; and
   an actuator coupled to at least one of the inner cone and the outer cone, the actuator comprising a rod and a piston, wherein the piston is actuated by a hydraulic force supplied by the pump, and wherein the actuator acts to overcome the force of the spring and to axially displace the outer surface of the inner cone with respect to the inner surface of the outer cone in a second direction, the second direction being axially opposite to the first direction.

2. The hydraulic pump of claim 1, wherein the clutch housing is removably coupled to the pump housing.

3. The hydraulic pump of claim 1, wherein the clutch housing is coupled to the pump housing via an SAE mounting flange.

4. The hydraulic pump of claim 1, wherein the outer cone is coupled to the drive shaft and the inner cone is coupled to the driven shaft.

5. The hydraulic pump of claim 1, wherein said spring is coupled to the inner cone and said actuator is coupled to the inner cone.

6. The hydraulic pump of claim 5, wherein said spring acts on the inner cone to bring the outer surface of the inner cone into frictional contact with the inner surface of the outer cone, and said actuator acts on the inner cone to overcome the force of the spring and disengage the frictional contact between the outer surface of the inner cone and the inner surface of the outer cone to disengage the clutch.

7. The hydraulic pump of claim 5, wherein said spring acts on the inner cone to maintain a disengaged configuration of the clutch wherein there is no frictional contact between the outer surface of the inner cone and the inner surface of the outer cone, and said actuator acts on the inner cone to overcome the force of the spring and to bring the outer surface of the inner cone into frictional contact with the inner surface of the outer cone to engage the clutch.

8. The hydraulic pump of claim 5, wherein the inner cone is axially displaced by actuating the rod in a direction toward the inner cone.

9. The hydraulic pump of claim 8, wherein the piston has a distal end and a proximal end, the rod being coupled to the proximal end, and wherein the rod is actuated by applying the hydraulic force to the proximal end of the piston.

10. The hydraulic pump of claim 5, wherein the inner cone is axially displaced by actuating the rod in a direction away from the inner cone.

11. The hydraulic pump of claim 10, wherein the piston has a distal end and a proximal end, the rod being coupled to the proximal end, and wherein the rod is actuated by applying a hydraulic force to the distal end of the piston.

12. The hydraulic pump of claim 1, wherein an angle between the frictional surfaces of the inner and outer cones and respective cone axes is directly proportional to an amount of hydraulic force required to axially displace the frictional surfaces with respect to each other.

13. A clutch for a hydraulic pump, comprising:
an outer cone with a frictional inner surface;
an inner cone with a frictional outer surface, the inner cone arranged inside the outer cone and rotationally and axially movable with respect to the outer cone;
a pre-stressed spring coupled to the inner cone, wherein said spring axially moves the inner cone in a first direction to bring the outer surface of the inner cone into frictional contact with the inner surface of the outer cone; and
an actuator coupled to the inner cone, the actuator comprising a rod engaging the inner cone and a hydraulically actuated piston engaging the rod;
wherein the actuator axially moves the inner cone in a second direction being axially opposite to the first direction to overcome the force of the spring and disengage the frictional contact between the outer surface of the inner cone and the inner surface of the outer cone.

14. The clutch of claim 13, wherein the inner cone is axially displaced by actuating the rod in a direction toward the inner cone.

15. The clutch of claim 14, wherein the piston has a distal end and a proximal end, the rod being coupled to the proximal end, and wherein the rod is actuated by applying a hydraulic force to the proximal end of the piston.

16. The clutch of claim 13, wherein the inner cone is axially displaced by actuating the rod in a direction away from the inner cone.

17. The clutch of claim 16, wherein the piston has a distal end and a proximal end, the rod being coupled to the proximal end, and wherein the rod is actuated by applying a hydraulic force to the distal end of the piston.

18. A clutch for a hydraulic pump, comprising:
an outer cone with a frictional inner surface;
an inner cone with a frictional outer surface, the inner cone arranged inside the outer cone and axially and rotationally movable with respect to the outer cone;
a spring coupled to the inner cone, wherein said spring acts on the inner cone to maintain a disengaged configuration of the clutch wherein there is no frictional contact between the outer surface of the inner cone and the inner surface of the outer cone; and
an actuator coupled to the inner cone, the actuator comprising a rod engaging the inner cone and a hydraulically actuated piston engaging the rod, wherein the actuator acts on the inner cone to axially displace the inner cone with respect to the outer cone to overcome the force of the spring and to bring the outer surface of the inner cone into frictional contact with the inner surface of the outer cone.

19. The clutch of claim 18, wherein the inner cone is axially displaced by actuating the rod in a direction toward the inner cone.

20. The clutch of claim 19, wherein the piston has a distal end and a proximal end, the rod being coupled to the proximal end, and wherein the rod is actuated by applying a hydraulic force to the proximal end of the piston.

21. The clutch of claim 18, wherein the inner cone is axially displaced by actuating the rod in a direction away from the inner cone.

22. The clutch of claim 21, wherein the piston has a distal end and a proximal end, the rod being coupled to the proximal end, and wherein the rod is actuated by applying a hydraulic force to the distal end of the piston.

* * * * *